May 26, 1953     T. R. WIESEMAN     2,640,177
STARTING CIRCUIT FOR ELECTRIC MOTORS
Filed Jan. 18, 1951
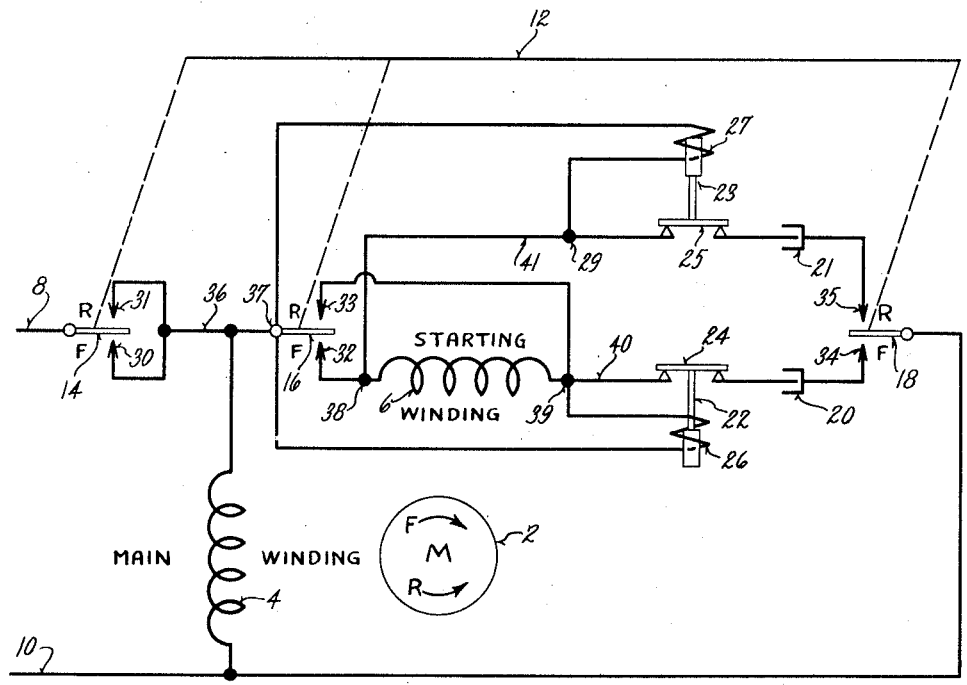
Inventor
Theodore R. Wieseman
By Ira Milton Jones
Attorney Patented May 26, 1953

2,640,177

UNITED STATES PATENT OFFICE 2,640,177

STARTING CIRCUIT FOR ELECTRIC MOTORS

Theodore R. Wieseman, Milwaukee, Wis., assignor to The Louis Allis Company, Milwaukee, Wis., a corporation of Wisconsin Application January 18, 1951, Serial No. 206,537

10 Claims. (Cl. 318—207)

This invention relates to starting circuits for electric motors and, more particularly, to a starting and reversing circuit for motors of the single phase, capacitor type.

The primary object of the invention is to provide an inexpensive but durable starting and reversing circuit for a single phase electric motor capable of undergoing quick reversal at frequent intervals. A typical problem solved by the invention arises in motors used for driving laundry machinery, wherein the motors reverse on the order of two and one-half to four times per minute.

In common with most comparable installations, the motor to which this invention pertains includes a main or running winding and a starting winding wound in quadriture axes. Whenever the main winding is energized to start the motor, the starting winding is connected in parallel with the main winding by a circuit including a capacitance which shifts the phase in the starting winding relative to the current in the main winding so as to provide maximum starting torque. The direction in which the motor starts is determined by the direction in which the current flows through the starting winding. Also as in previous circuits, when the motor comes up to normal running speed, the starting winding is cut out by a voltage-responsive relay connected in parallel with the starting winding.

It is thus apparent that a capacitor in series with the starting winding is subject to great surges of current at frequent intervals, and, therefore, the relatively inexpensive electrolytic capacitor ordinarily would not stand up under such hard service. It is, therefore, an object of this invention to provide a starting circuit utilizing two electrolytic capacitors, one to be used for starting the motor in the forward direction and the other for starting the motor in the reverse direction, thereby utilizing each capacitor only half as hard as before. A related object in this invention is to ensure that one capacitor shall have a period of rest while the other is being utilized, the alternately usable starting circuits with which the capacitors are respectively associated being mutually exclusive.

Another object of the invention is to provide a motor starting circuit of the type employing a reversible starting winding with a pair of alternately usable capacitors, each having its own disconnecting relay capable of responding to the impressed voltage across the starting winding so that the relay being used opens at the end of the starting cycle of the motor, and stays open in response to the back voltage induced in the starting winding when the motor attains running speed. By a unique but simple switching circuit, it is now proposed that the relay controlling the out-of-use capacitor be temporarily disabled in a condition of readiness for action immediately upon reversal of the circuit, thereby avoiding the delays encountered with a single voltage-controlled relay. Heretofore, improvements in single-capacitor, single-relay starting circuits have been devoted to quick closing of the speed or voltage-responsive relay upon reversal of the starting winding whereas, in this invention, alternatively used branch circuits, each including a relay, are provided for the starting winding so that no matter how quickly the starting circuit is reversed, there is always a branch circuit, preconditioned with a closed relay, in readiness to accept control. By use of the alternately operable capacitors and relay circuits, a further benefit resides in that, should the capacitor or relay fail in the forward-starting circuit, for instance, the reversing circuit would remain intact so that the motor could be started and re-started in the reverse direction, and so also that the exact location of the failure could easily be detected.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

The single figure diagrammatically illustrates the invention as applied to a single phase electric motor, the conventional features of which have been eliminated with the understanding that the specific form and location of the motor winding and electrical values of all the components will be readily understood by those skilled in the art.

Referring now to the drawing, the numeral 2 indicates the rotor of a single phase, capacitor type motor M having a main winding 4 and a starting winding 6 energized from a suitable source of single-phase alternating current through leads 8 and 10. The rotor 2 is started in a forward or reverse direction, respectively indicated by the curved arrows F and R, by depressing or raising a reversing switch 12 to its F or R positions. While starting, one of two capacitors 20 or 21 is connected in series with the starting winding 6 to shift the phase of the current, preferably 90 electrical degrees, from that flowing through the main winding 4 so as to provide more torque at zero and slow rotor speeds. The direction in which torque is applied to the rotor 2 depends upon the direction in which the reversing switch 12 is thrown to feed current through starting winding 6. When the rotor 2 attains running speed, the starting winding 6 is cut off by one or the other of two relays 22 or 23.

The reversing switch 12, which may be manually, mechanically or electrically controlled, is shown with three electrically separate, contactors 14, 16 and 18 respectively moveable, as a gang in double-throw fashion, in the F direction to engage three forward contacts 30, 32 and 34 or in the R direction to engage three reverse contacts 31, 33 and 35. Contacts 30 and 31 are connected by a common lead 36 to one terminal of the main winding 4 so that the latter is energized whenever the reversing switch 12 is closed in either direction and, of course, the main power supply circuit 8—10 is broken when the switch is in its intermediate or "off" position and whenever it is moved from one closed position to the other.

The starting winding 6 has, at its ends, two terminals 38 and 39, respectively. If, when the circuit for the main winding 4 is closed by depression of the switch 12 to move its contactors in the F direction, current is simultaneously started through the starting winding in what may be considered as the direction from terminal 38 to 39, and torque is applied to the rotor 2 in the forward direction. Relays 22 and 23 being normally closed, a starting circuit is thus established from the common lead 36 via terminal 37, switch contactor 16, forward contact 32, terminal 38, starting winding 6, terminal 39, lead 40, the closed contactor 24 of forward relay 22, electrolytic capacitor 20, forward contact 34, switch contactor 18, and back through main lead 10 to the source of the current which, of course simultaneously energizes main winding 4.

If torque is to be applied to rotor 2 in the reverse direction, the reversing switch 12 is lifted so as to move its contactors in the R direction, and then the starting current path is through common lead 36, terminal 37, switch contactor 16, contact 33, terminal 39, winding 6, lead 41, the closed contactor 25 of reverse relay 23, electrolytic capacitor 21, reverse contact 35, switch contactor 18, to main lead 10.

The forward and reverse relays are biased by gravity, as in the embodiment of the invention shown, or by springs to hold their circuit breakers 24—25 normally closed. The significant characteristic of the relays is that a predetermined voltage through their coils 26—27 is required to effect actuation and opening of their respective circuit breakers.

The coil 26 of the forward relay 22 is connected between terminals 37 and 39 whereas the coil 27 of the reverse relay 23 is connected between terminal 37 and a terminal 29 on lead 41 which extends between the terminal 38 of the starting winding and one side of the circuit breaker 25. Thus, whenever the switch contactor 16 engages the forward contact 32 the coil 26 of the forward relay 22 is connected across and hence in parallel with the starting winding 6, and the coil 27 of the reverse relay 23 is shorted out by having its ends connected together by the circuit including the terminal 29, the lead 41, the terminal 38, the contact 32, the switch contactor 16 and terminal 37.

Moving the contactor 16 into engagement with the reverse contact 33 connects the coil 27 of the reverse relay 23 across and hence in parallel with the starting winding 6 and shorts out the coil 26 of the forward relay 22 by connecting the ends of the coil together by the circuit extending directly between terminals 37 and 39 via the switch contactor 16 and the reverse contact 33.

These two parallel energizing and shorting circuits for the coils 26—27 result from the fact that each coil has one end connected to the common lead 36 at the terminal 37 while the other end of the coil 26 connects with one end of the terminal 39 of the starting winding and the other end of the coil 27 connects with the conductor 41 leading to the opposite end 38 of the starting winding.

It is thus apparent that there are two alternatively usable, and in fact mutually exclusive, phase shifting or starting circuits to which the starting winding is a common element. The "forward" circuit extends from the terminal 38 at one end of the starting winding 6 through the winding and from its other end terminal 39 through the normally closed circuit breaker 24 of the "forward" relay 22 to the capacitor 20. The "reverse" phase shifting or starting circuit extends from the terminal 39 back through the starting winding 6 to its other end terminal 38, and across the normally closed circuit breaker 25 of the reverse relay 23 to the capacitor 21.

In a typical operating cycle, beginning with the switch 12 in its neutral of "off" position, so that both relays 22 and 23 are de-energized and their respective circuit breakers are in their normally closed positions, actuation of the switch 12 to bring its contactors 14, 16 and 18 into engagement with the forward contacts 30, 32 and 34, respectively, connects the main winding 4 across the supply lines and activates the forward starting or phase shifting circuit which includes the capacitor 20 and the circuit breaker 24. It also connects the coil 26 of the forward relay 22 across the starting winding and short circuits the coil 27 of the reverse relay 23 as described hereinbefore.

The motor thus starts in its forward direction but until it comes up to the running speed the voltage across the coil 26 is too low to actuate the relay to open its circuit breaker 24. Consequently, the starting winding is automatically held in the circuit for the proper time. When the relay responds and its circuit breaker 24 opens the "forward" starting circuit drops out but the back voltage induced in the starting winding 6 and impressed across the relay coil 26 holds the relay 22 in its circuit breaking position.

Upon reversing the position of the switch 12 to bring its contactors 14, 16 and 18 into engagement with the reverse contacts 31, 33 and 35, the main winding 4 is momentarily de-energized and the circuit through the starting winding 6 is reversed by closure of the other starting or phase shifting circuit which includes the then closed circuit breaker 25 and the capacitor 21. Such reversal of the switch 12, of course, also shorts out the coil 26 of the forward relay 22 in the manner hereinbefore described so that its circuit breaker 24 assumes its normally closed position.

Reclosure of the circuit breaker 24, however, does not reconnect the capacitor 20 since its circuit is at that time open at contact 34. The capacitor 20 thus has time to "rest" and perhaps heal while its companion 21 is active.

As described in connection with the forward operation of the switch, the circuit breaker 25 of the reverse starting circuit remains closed until the rotor 2 approaches running speed whereupon sufficient voltage is impressed across the coil 27 to activate the relay and open the circuit breaker 25.

From the foregoing description taken in connection with the accompanying drawings and the claims it will be clear to those skilled in the art that this invention provides a motor starting circuit which is admirably suited to the control of motors which are subject to being very frequently and rapidly reversed, and that by virtue of the separate mutually exclusive starting and reversing circuits each of which contains its own capacitor, a far more durable and faster acting control is obtained.

What I claim as my invention is:

1. In a control for a reversible, single phase, capacitor motor having a stator provided with starting and main windings: a first phase-shifting circuit extending through the starting winding from one end thereof and including a capacitor connected in series with the other end of the starting winding; a second phase-shifting circuit extending through the starting winding from said other end thereof and including another capacitor connected in series with the first designated end of the starting winding; and switch means for selectively connecting said phase-shifting circuits in parallel with the main winding, whereby selectively to connect one end or the other of the starting winding to one of the ends of the main winding.

2. A control for a reversible, single phase, capacitor motor having a stator provided with starting and main windings, comprising: a first phase-shifting circuit extending through the starting winding from one end thereof and including a capacitor connected in series with the other end of the starting winding; a second phase-shifting circuit extending through the starting winding from said other end of the winding and including another capacitor connected in series with the first designated end of the starting winding; switch means for selectively connecting said phase-shifting circuits in parallel with the main winding, whereby selectively to connect one end or the other of the starting winding to one of the ends of the main winding; and circuit breaker means for opening the selected phase-shifting circuit in response to attainment by the motor of a predetermined running speed.

3. A control for a reversible, single phase, capacitor motor having a stator provided with starting and main windings, comprising: a first phase-shifting circuit extending through the starting winding from one end thereof and including a capacitor connected in series with the other end of the starting winding; a second phase-shifting circuit extending through the starting winding from its other end and including another capacitor connected in series with the first designated end of the starting winding; a reversing switch having a forward position and a reverse position for selectively connecting one or the other of the phase-shifting circuits in parallel with the main winding so that one or the other ends of said starting winding is connected to one end of the main winding and so that one capacitor is out of circuit during the starting of the motor in the forward direction while the other capacitor is out of the circuit during starting of the motor in the reverse direction; and normally closed circuit breaker means in each phase-shifting circuit responsive to a factor varying with the speed of the motor for opening the active phase-shifting circuit when the motor comes up to speed.

4. The motor control of claim 3 further characterized by the fact that said circuit breaker means are electromagnetic with each having an operating coil; and connections under the control of the reversing switch for connecting the operating coil of the circuit breaker means in the selected phase-shifting circuit across the starting winding and shorting out the coil of the circuit breaker means in the other phase-shifting circuit.

5. A control for a reversible, single phase, capacitor motor having a stator provided with starting and main windings, comprising: a first phase-shifting circuit extending through the starting winding from one end thereof and including a normally closed circuit breaker, and a capacitor connected in series with the other end of the starting winding; a second phase-shifting circuit extending through the starting winding from said other end thereof and including another normally closed circuit breaker, and another capacitor connected in series with the first designated end of said starting winding; switch means for selectively connecting said phase-shifting circuits in parallel with the main winding, whereby selectively to connect one end or the other of the starting winding to one of the ends of the main winding; and means responsive to the voltage across the starting winding for opening the circuit breaker in the selected phase-shifting circuit when said voltage attains a predetermined value.

6. A control for a reversible, single phase, capacitor motor having a stator provided with starting and main windings, comprising: a first phase-shifting circuit extending through the starting winding from one end thereof and including a first circuit breaker, and a capacitor connected in series with the other end of the starting winding; a second phase-shifting circuit extending through the starting winding from said other end thereof and including a second circuit breaker, and another capacitor connected in series with the first designated end of the starting winding; first and second voltage-responsive actuating circuits for said first and second circuit breakers, respectively; and switch means selectively actuatable between two circuit closing positions, in one of which the first actuating circuit is shunted across the starting winding with the said one end of said starting winding connected to one end of said main winding and the first phase-shifting circuit is connected in parallel with the main winding, while in the other of which the second actuating circuit is shunted across the starting winding with the said other end of said starting winding connected to the aforesaid one end of said main winding and the second phase-shifting circuit is connected in parallel with the main winding.

7. A control for a reversible, single phase, capacitor motor having a stator provided with starting and main windings, comprising: a forward starting circuit extending through the starting winding from one end thereof and including a first circuit breaker, and a phase-shifting capacitor connected in series with the other end of the starting winding; a reverse starting circuit extending through the starting winding from said other end thereof and including a second circuit breaker, and another phase-shifting capacitor connected in series with the first designated end of the starting winding; a switch common to the two starting circuits and connected with the main winding, said switch being movable between forward and reverse positions to selectively connect said starting circuits in parallel with the main winding and thus selectively connect one or the other ends of said starting winding to one end of said main winding; and means including the switch for effecting opening of the circuit breaker in either selected starting circuit upon the attainment of a predetermined voltage across the starting winding in consequence to the motor coming up to speed.

8. A control device for a reversible, single phase capacitor motor having a stator provided with starting and main windings, comprising: first and second series circuit means each connected at one of their ends to respectively opposite ends of the starting winding and having switch contacts at their other ends; each of said series circuit means including a phase-shifting capacitor and a normally closed circuit breaker; first switch means including a contactor connected to one end of the main winding and movable between a pair of contacts respectively connected to the ends of the starting winding; second switch means including the contacts at the said other ends of the series circuit means and another contactor movable therebetween; a connection between the last-mentioned contactor and the other end of the main winding whereby said contactors may be actuated to reverse the connections to said starting winding while alternatively connecting in series therewith one or the other of said series circuit means; means for connecting the ends of the main winding to a source of current; and means responsive to a factor varying with the speed of the motor for opening the circuit breaker in the connected series circuit means.

9. A control device for a reversible, single phase capacitor motor having a stator provided with starting and main windings, comprising: forward and reverse starting circuit means connected at one of their ends to respectively opposite ends of the starting winding and having switch contacts at their other ends, each of said series circuit means including a phase-shifting capacitor and a normally closed electromagnetic circuit breaker; a switch contactor connected to one end of the main winding and movable between a pair of contacts respectively connected to the ends of the starting winding; another switch contactor connected to the other end of the main winding and movable between the contacts at said other ends of said circuit means whereby said switch may be actuated to alternatively connect one or the other of said starting circuit means in series with the starting winding; voltage responsive coils for said circuit breakers; connections governed by said first designated contactor for shunting the coil of the circuit breaker in the connected starting circuit across said starting winding; means for connecting the ends of the main winding to a source of current; and means for momentarily interrupting the main winding circuit during reversal of the connections to the starting winding.

10. In a reversing electric motor having a main winding, a starting winding, forward and reverse starting circuits for the starting winding, and a reversing switch for selectively connecting one or the other of said starting circuits in series with the starting winding, characterized by: a capacitor and a normally closed circuit breaker in each of said starting circuits; and means responsive to a factor varying with the speed of the motor for opening the circuit breaker in the active starting circuit when the motor comes up to speed.

THEODORE R. WIESEMAN.

References Cited in the file of this patent
UNITED STATES PATENTS

| Number | Name | Date |
|---|---|---|
| 1,960,820 | Lewis et al. | May 29, 1934 |
| 2,141,056 | Watkins | Dec. 20, 1938 |
| 2,213,892 | West | Sept. 3, 1940 |
| 2,388,382 | Brongersman | Nov. 6, 1945 |
| 2,545,639 | Wolff et al. | Mar. 20, 1951 |